(12) United States Patent
Freeburne (10) Patent No.: US 8,775,820 B1
(45) Date of Patent: Jul. 8, 2014

(54) SYSTEM AND METHOD OF ENTERPRISE ADMINISTRATIVE PASSWORD GENERATION AND CONTROL

(75) Inventor: Alexander B. Freeburne, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2509 days.

(21) Appl. No.: 11/446,284

(22) Filed: Jun. 2, 2006

(51) Int. Cl.
*G06F 21/00* (2013.01)
*H04L 29/06* (2006.01)
*G06F 21/45* (2013.01)

(52) U.S. Cl.
CPC ............ *H04L 63/0838* (2013.01); *G06F 21/45* (2013.01)
USPC .............................................. 713/184; 726/6

(58) Field of Classification Search
USPC .................. 709/229; 713/1–2, 100, 182–184; 726/1–10, 26–30
See application file for complete search history.

(56) References Cited

U.S. PATENT DOCUMENTS

| | | | | |
|---|---|---|---|---|
| 4,800,590 | A | | 1/1989 | Vaughan |
| 5,588,056 | A | * | 12/1996 | Ganesan ........................ 713/183 |
| 5,592,553 | A | * | 1/1997 | Guski et al. .................... 713/159 |
| 5,661,807 | A | * | 8/1997 | Guski et al. .................... 713/159 |
| 6,161,185 | A | * | 12/2000 | Guthrie et al. ..................... 726/5 |
| 6,178,508 | B1 | * | 1/2001 | Kaufman ........................ 713/183 |
| 6,470,454 | B1 | * | 10/2002 | Challener et al. ............... 726/17 |
| 6,496,937 | B1 | * | 12/2002 | Ichihara ............................ 726/6 |
| 6,601,175 | B1 | * | 7/2003 | Arnold et al. ...................... 726/7 |
| 6,731,731 | B1 | | 5/2004 | Ueshima |
| 7,836,407 | B2 | | 11/2010 | Pettinati |
| 8,484,482 | B1 | | 7/2013 | Cherukumudi et al. |
| 2002/0178370 | A1 | * | 11/2002 | Gurevich et al. ............. 713/189 |
| 2005/0015601 | A1 | * | 1/2005 | Tabi .............................. 713/182 |
| 2005/0268345 | A1 | | 12/2005 | Harrison et al. |
| 2012/0136572 | A1 | | 5/2012 | Norton |

OTHER PUBLICATIONS

Cherukumudi, Vijaykumar, et al., Patent Application entitled "Password Generation and Validation System and Method," filed Mar. 7, 2011, U.S. Appl. No. 13/042,015.
FAIPP Pre-Interview Communication dated Jan. 2, 2013, U.S. Appl. No. 13/042,015, filed Mar. 7, 2011.
Notice of Allowance dated Mar. 4, 2013, U.S. Appl. No. 13/042,015, filed Mar. 7, 2011.

* cited by examiner

*Primary Examiner* — Gilberto Barron, Jr.

(57) ABSTRACT

A system for password generation and control is provided. The system includes a client and a server system. A password component is operable on the client system for automatically on a re-occurring basis generating a password for an application operable by the client system based upon at least two inputs accessible from the client system. A password manager component is operable on the server system to generate the password using the at least two inputs to enable access to the application the client system.

20 Claims, 6 Drawing Sheets

SYSTEM AND METHOD OF ENTERPRISE ADMINISTRATIVE PASSWORD GENERATION AND CONTROL

CROSS-REFERENCE TO RELATED APPLICATIONS

Not applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND

Information security is a vital concern in maintaining the operation of an organization. Governments and corporations rely on information security to maintain operations without disruption from threatening entities. Today, information security methods have evolved due to the advent of the computer and computer networks. Large corporations generally include thousands of computers, which are each operated by a user for conducting business. Each computer includes a password for allowing the user access to the computer and services associated with a network. Technicians regularly install new services and/or troubleshoot problems associated with the network or the user's computer. The technicians and co-worker gain access to the network and the user's computer by means of a password. Safe guarding passwords is vital for maintaining information security.

SUMMARY

A system for password generation and control is provided. The system includes a client and a server system. A password component is operable on the client system for automatically on a re-occurring basis generating a password for an application operable by the client system based upon at least two inputs accessible from the client system. A password manager component is operable on the server system to generate the password using the at least two inputs to enable access to the application on the client system.

In an embodiment, a method for password generation and control is provided. The method includes obtaining a tag associated with a client computer, and generating a password using the tag. The password is used for an application accessible by the client computer. The method includes updating the application with the password to allow access to the application via the generated password. The tag may be stored in a database or other data store. The password for the application is generated using the tag.

A system for password generation and control is provided. The system includes a first computer and a second computer. A password component obtains a tag and uses the tag to generate a password for an application used on the first computer. The tag is related to the first computer. A database stores information including the tag. A manager component is operable on the second computer to obtain the tag from the database and uses the tag to generate the password to enable access to the application on the first computer.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Information security in a computer-based enterprise is generally achieved by employing passwords that are used by a user to gain access to the computer and/or enterprise services. Often, stored passwords are encrypted by an application into larger American Standard Code for Information Interchange (ASCII) characters strings or hashed strings, which provides security to the computer or enterprise service. Encrypted passwords are often transparent to the user and serve to safe guard the user's password from unauthorized access by others. Large corporations generally include thousands of computers, each of which may be operated by a user for conducting business. Technicians or system administrators regularly install new services, maintain, and/or troubleshoot problems associated with the network or the user's computer. Also, fellow computer users may gain access to other's passwords as well. These technicians, system administrators, or others may gain access to the network and the user's computer by means of the user's password or administrative passwords operable for one or more computers.

Some organizations may have large networks with many computers, such as a customer support center of a telecommunications company. Security is a concern in these telecommunication enterprises, which includes a myriad of associated business and other networks. System administrators may access these computers by using one or more enterprise or administrator passwords. Tracking these passwords and maintaining the confidentiality of each of these passwords becomes challenging.

Accordingly, the present disclosure contemplates a system and method that provides for password generation and control of enterprise assets and services. The first system includes a password component, which may be provided on a computer operable for automatically on a re-occurring basis, such as daily, generating a password based upon at least two inputs obtainable from the computer associated with a network. At least one of the inputs that forms the password may be unique to each computer, such as a serial number or other unique identifier of a computer that is not readily modifiable by the user. The second input may or may not be unique to each computer. The system also includes a password manager component, which may be provided on a separate computer. The password manager component has access to both the unique identifier, such as the serial number, and the second input. The password manager component also has operable aspects of the password component to generate the same password for use to access the computer.

In some embodiments, the password component is provided on each of the network computers, entities, or clients. The password manager component may reside on a server or other systems or devices remotely located from the client. In this manner, each system or computer is provided with the password component operable to periodically generate and update the computer with a unique password. Using the same system for password generation, the password manager component is able to generate the correct password for any of the related computers in the enterprise without the need for databases to store, synchronize, or otherwise maintain to track passwords for numerous enterprise computers.

Figure 1A:
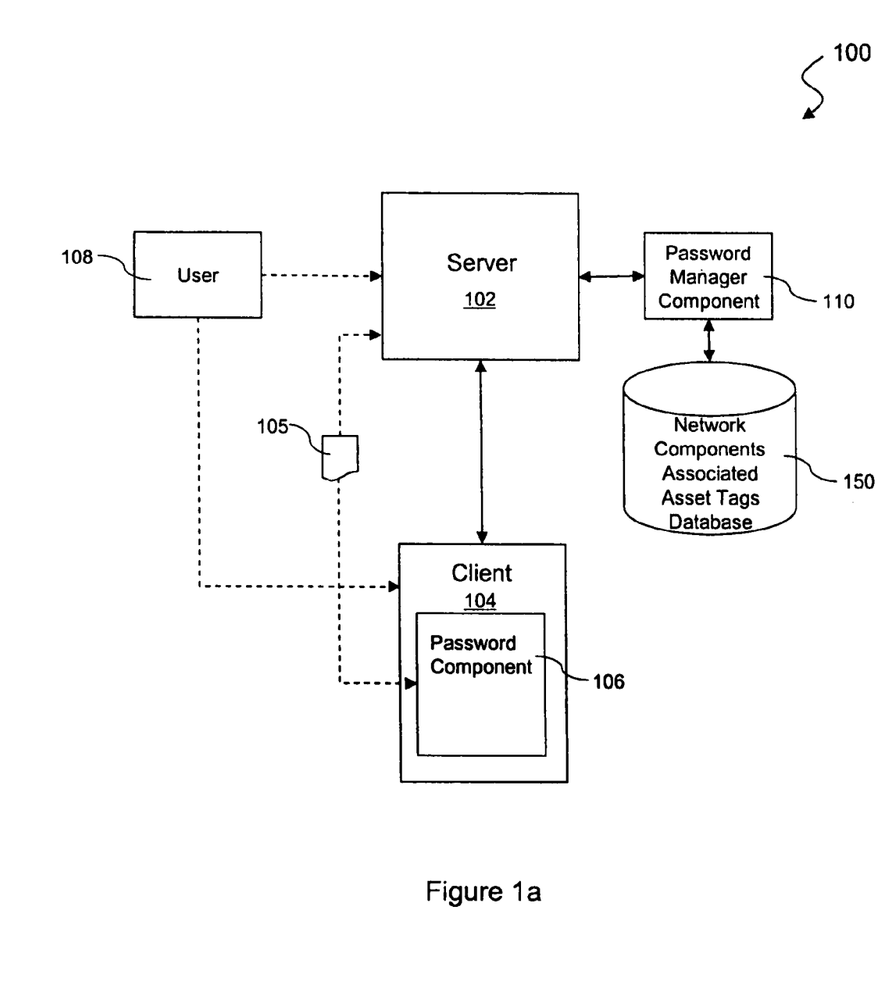
FIG. 1a is a block diagram of an embodiment of the present disclosure.

In still other embodiments, the present disclosure contemplates a system and method that transparently and dynamically generates administrative passwords that may not be visible to the user or to the administrator. Each computer and server may include a unique password that changes on a re-occurring basis and that may be generated by one or more administrative applications such as the password management component 110. The administrative password may also be generated without the computer being connected to the network.

Turning now to FIG. 1a, a system 100 for password generation and control is depicted. The system 100 includes a server 102 in communication with a client 104. The client 104 and/or the server 102 may include one or more applications, programs, data stores, and/or other computer-based systems. The client 104 and the server 102 may be a general-purpose computer, which is discussed hereinafter in greater detail. The client 104 and server 102 may be a desktop or workstation computers, portable, laptops, or mobile telephone handsets or personal digital assistants (PDAs), network components and systems such as routers, printers, copiers, and other intelligent devices where secure access is useful or desired. The client 104 may also refer to the application or operating system which is password protected.

In an embodiment, the client 104 includes a password component 106 operable for generating an administrative or enterprise password 105. The application, software, or system for which the password is generated or used may be any system such as BIOS, operating systems, or any system or software on a computer or system. As an example, the password 105 may be employed for purposes of accessing the client 104 for administrative operations such as software installation, and/or other maintenance procedures performed by the user 108. This administrative or enterprise password 105 may be in addition to the standard user password, which is used by the user of the client 104 in the ordinary course of daily use of the client 104, such as to access user or business applications. The administrative or enterprise password 105 is used by administrators and others to make system or other changes, and provides access without the need to know the user's personal password. The administrative or enterprise password 105 may provide the same or perhaps higher-level access than a user's personal password.

The user 108 may include a technician and/or a system administrator who may have access to the server 102 and/or other entities in an embodiment. The user 108 may also include a primary user of the client 104 which may ordinarily only have, access to the client 104.

The password component 106 may be located on the client 104 or may be located on the server 102 in some embodiments. The password component 106 may include one or more applications, algorithms, and/or scripts that may be adapted for conducting one or more operations such as generating the password 105. In some embodiments, the password component 106 may operate independent of external inputs to form the password 105. For example, the password component 106 may utilize two inputs such as a date or time provided by the client 104, such as the computer's current date, and a unique asset tag of the client 104. The date or time may be provided to the password component 106 by an internal clock of the client 104. The asset tag, which may also be referred to as a tag, may include or be comprised of a unique numeric and/or alphanumeric string of characters stored on the client 104, such as a serial or other number associated with one or more components or pieces of the computer, but could be software or other aspects of the client 104. In an embodiment, the asset tag may be stored within a electronically programmable read only memory (EPROM), electronically erasable programmable read only memory (EEPROM), a basic input/output system (BIOS) read only memory, or other microelectronic device that may not be altered by the user 108. Of course, the asset tag may also be stored on other media associated with the client 104 such as a magnetic hard disk, flash memory, and/or other electronically programmable media. As discussed above, the asset tag may also be a sticker, label, name or other indicia on the computer or system, or might be a computer name or number accessible such as via software such as Microsoft Windows. Alternatively, the password component 106 may utilize at least one input from an external source such as the server 102 to form the password 105. In still other embodiments, the tag or one of the inputs might be a soft setting or string which might be obtained from or stored in a file or registry.

In another embodiment, the password component 106 may utilize other inputs such as MAC addresses, IP addresses, serial numbers, personal identification numbers, (PINS), social security or other numbers, or strings associated with the client 104 or user of the client 108, and/or other inputs that may be utilized to form the password 105.

The password component 106 may be hardware or software based. For example, the password component 106 may reside within a BIOS ROM device, or other programmable microelectronic device and therefore could not be altered by the user 108 and/or other entities. Alternatively, the password component 106 may include a software driver that may be executed upon boot-up of the client 104 and prior to a login screen that may require input from the user 108. The password component 106 may operate transparent of the user's 108 awareness, and may generate the password 105 on a re-occurring schedule. For example, the password component 106 may generate the password 105 daily at a predetermined time, such as every night at a specified time, or on first start-up following that time if the computer was turned off at the specified time.

The password component 106 may further include one or more applications, functions, routines, or algorithms operable for altering a string of characters formed by the two inputs. For example, a hashing routine may be employed for creating a string of characters from the two inputs that may not be easily or at all deciphered back into the original inputs. In one embodiment, the password component 106 during one of the steps may generate a string of characters that in some cases may include from a few hundred to more than several thousand, but in other embodiments fewer or more characters may be used. In an embodiment, a salt routine for example may also be employed to amend a pre-determined string of characters or bytes of about 2 characters or bytes and about 8 characters or bytes (1 byte may be about 8 bits) to the string of characters, but more or fewer bytes may be used in other embodiments. Other routines and/or methods may be employed that include mathematical functions such as algebraic, trigonometric, and/or other mathematical functions that may be applied to the string of characters. In final steps of processing, pre-determined characters from the string of characters may be selected to form the password 105. The pre-determined characters may be determined by one or more rules. For example, a rule may mandate that the password include at least one lower-case letter, at least one capital letter, and at least one number. The password component 106 is further operable to update the system, such as the MS Windows password, with the generated password 105. In this manner, the password component 106 is operable to generate and update the password 105 to secure and enable access to the client 104, without the need to store and maintain a list of passwords. In one embodiment, the password component 106 and or client 104 might only update the system or administrative passwords and leave the user passwords unchanged. In other embodiments, the algorithm that generates the password from the asset tag may employ well known mathematical techniques so that similar, or perhaps nearly identical, asset tags or inputs generate widely different outputs.

A password manager component 110 may exist on the server 102 and operates remote to the client 104 and employs operational aspects of the password component 106 to generate the password 105. The password manager component 110 enables the user 108 the ability to access the client 104 by generating the password 105 that grants access to the client 104. For example, the password manager component 110 may assemble a list of entities associated with a network. The network may include the client 104, wherein the password manager component 110 extracts an associated asset tag from the client 104 and utilizes a date or time provided by the server 102 to generate the password 105.

As discussed above, the password manager component 110 may receive the asset tag as input directly by the administrator to generate the password. In other embodiments, the password manager component 110 may also maintain in a database or data store a list of entities of a network including the associated asset tags. In that case, the password manager component 110 might access the database 150 to obtain the tags and determines the appropriate date, for example, used by the password component 106, to enable the password manager component 110 to generate the password associated with each of the entities or clients 104. The password manager component 110 may also dictate a time or date when a new password will be generated on the client 104 by the password component 106. The password manager component 110 may allow the user 108 the ability to configure or alter the methods incorporated into the password component 106 to form the password 105.

In other embodiment, the database 150 may be used to maintain an auditable record of the passwords that were generated, such as the user requesting the password, the computer or system for which the password was requested and so on. Of course, it is understood that the password component 106 and/or the password manager component 110 may operate and create the password 105 without being connected to a network. In one embodiment, when a user, such as a supervisor or technician, needs access to a computer, the user may read the tag off or from the computer. For example, the tag may be a label or sticker readily accessible or visible to a user of the computer. The tag may also be a Windows computer name, or other easily accessible identifiers. The user then contacts a manager or other administrator that has access to the password manager component 110. The user then gives the administrator the tag, which the administrator uses as input to the password manager component 110 to generate the password for that computer or system. In this case, none of the tags may need to be store or saved in a database or other system.

In still other embodiments, the password manager component 110 and/or the password component 106 might not be hard-coded as to the particular type of tag used to generate passwords. A flag or other input might cause the password manager component 110 and/or the password component 106 to dynamically retrieve and use a different type of tag, such as a serial number based on a first flag setting and an IP address based on another flag setting. In this manner, the password manager component 110 and/or the password component 106 might use one type of tag, such as a serial number, to generate passwords for one computer, while another tag, such a the IP address, might be used to generate passwords for another computer.

Figure 1B:
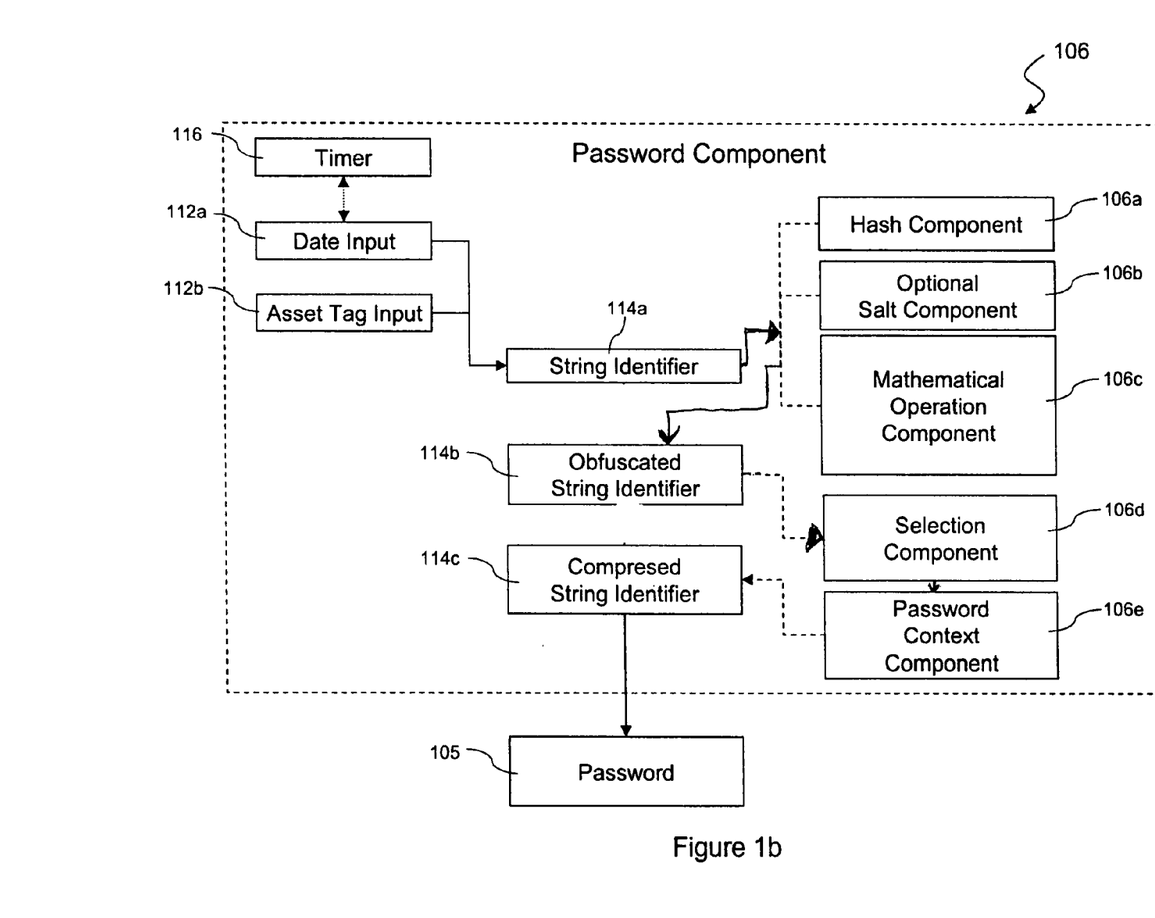
FIG. 1b is a block diagram of a password component according to one embodiment of the present disclosure.

Turning now to FIG. 1b, a block diagram depicts another embodiment of the password component 106. The password component 106 includes a hash component 106a, an optional salt component 106b, a mathematical operation component 106c, a selection component 106d, and a password context component 106e. The components 106a-e may perform one or more steps for processing a date input 112a and an asset tag input 112b to generate the password 105.

In an embodiment, a string identifier 114a may be formed having the date input 112a and/or the asset tag input 112b. The date input 112a may be provided by a timer 116 located of the client 104. The timer 116 may include a system clock and may also determine a time when the date input 112a may be provided to the password component 106. In some embodiments, the server 102 may provide the date input 112a. The string identifier 114a may include a myriad of combinations of the date input 112a and the asset tag input 112b. For example, date input 112a may be listed together into a single string of ASCII characters. The string identifier 114a may be sequentially or in parallel manipulated by one or more of the components 106a-c. While the present embodiment is shown using date and/or time in combination with the asset tag as inputs that are used to generate the password, any number of additional inputs might be used and the present disclosure is not limited to only two inputs.

The hash component 106a may alter the string identifier 114a into an obfuscated string identifier 114b that may not be easily or at all reversed back into the date input 112a and/or the asset tag input 112b. The obfuscated string identifier 114b formed during one or more steps by the hash component 106a may generate a string of characters that in some cases may include from a few hundred to more than several thousand, but in other embodiments fewer or more characters may be used.

In some embodiments, the optional salt component 106*b* may provide one or more operations that further provide complexity to the obfuscated string identifier 114*b*. For example, the salt component 106*b* may amend a pre-determined string of characters of about 2 bytes and about 8 bytes (1 byte may include 8 bits) to the obfuscated string of characters 114*b*, but more or fewer bytes may be used in other embodiments.

The mathematical operation component 106*c* may further complicate the obfuscated string identifier 114*c* by applying one or more mathematical operations to one or more characters of the obfuscated string identifier 114*c*. For example, the component 106*c* may apply a cosine or other functions to one or more pre-determined characters set forth by the password manager component 110 and the password component 106. The component 106*c* may also apply other mathematical functions that may include, but are not limited to, addition, subtraction, multiplication, and/or division, trigonometric functions or other mathematical techniques or systems to adjacent or non-adjacent characters of the obfuscated string identifier 114*b*. Of course, other operations or functions may be applied by the component 106*c* that may be set forth by the password manager component 110 and/or the password component 106.

The selection component 106*d* may select one or more characters of the obfuscated string identifier 114*b*. In an embodiment, the password context component 106*e* may received the characters from the selection component 106*d* and analyze the password for characters that may not be desirable for the password 105. The password context component 106*e* may also include one or more context selection rules for authorizing the use of the compressed string identifier 114*c* and/or the password 105. For example, the password context component 106*e* may include one or more string of characters, which may not be appropriate for use in a corporate environment, such as strings including inappropriate words or language.

The password context component 106*e* may provide the password to compressed string identifier 114*c*. The term "compress" as used herein may refer to either lossy or lossless compression. The compressed string identifier 114*c* may include at least one character and may be substantially smaller than the obfuscated string identifier 114*b* in an embodiment. The compressed string identifier 114*c* may be utilized to form the password 105. The password context component 106*e* would reject the compressed string identifier 114*c* or the password 105 upon a match to one or more string of characters stored in the password context component 106*e*. Alternatively, the password context component 106*e* may apply one or more of the context selection rules to reject the compressed string identifier 114*c* or the password 105. For example, a context selection rule may dictate that the compressed string identifier 114*c* or the password 105 may or may not include two adjacent numbers and/or characters such that the password 105 or compressed string identifier 114*c* may not form words.

Figure 1C:
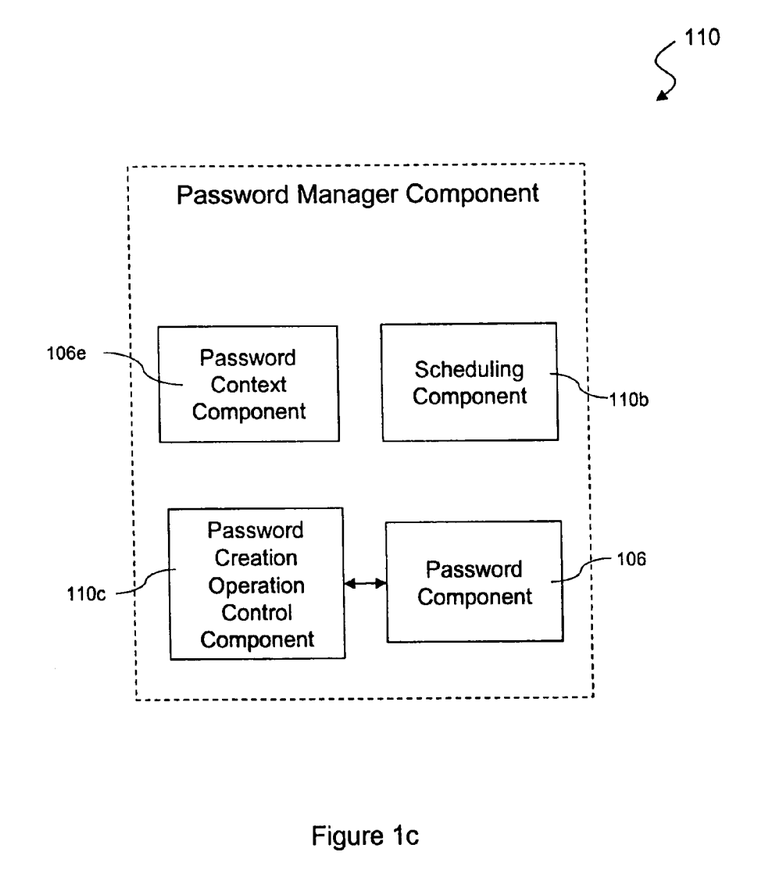
FIG. 1c is a block diagram of a password management component according to one embodiment of the present disclosure.

Turning now to FIG. 1*c*, a block diagram depicting another embodiment of the password manager component 110. The password manager component 110 includes a scheduling component 110*b*, a password creation operation control component 110*c*, the password context component 106*e*, and the password component 106. In an embodiment, the password manager component 110 enables the user 108 or system administrator the ability to access and to control formation of the password 105 of the client 104 through the password component 106. The password component 106 allows the user 108 or an administrator to use the password component 106 to produce the password 105 that enables access to the client 104. For example, the server 102 may include the password manager component 110 that includes the password component 106. The client 104 also having the password component 106 may generate on a re-occurring basis the password 105. The password manager component 110 accesses the client 104 by generating the same password created by the client 104, and thus grants the user 108 control or accesses to the client 104. Administrative password creation and security may be achieved through the password component 106 which may simultaneously reside on the server 102, the password manager component 110, and/or the client 104. In this manner, the server 102 and the client 104 may be each capable of producing the same password, and therefore the password 105 does not need to be stored on a database.

In some embodiments, the client 104 and/or password component 106 are inoperable for receiving outside input to prevent hackers or other from attempting to derive the password. As such, passwords may only be generated via the password manager component 110.

The scheduling component 110*b* may include one or more applications and data stores adapted for altering one or more operations of the password component 106. For example, the scheduling component 110*b* may include a list of clients and a list of associated dates for altering the operations for generating the password 105 of the client 104. Therefore, the associated date may trigger an automatic modification of the password component 106, and thereby triggering the modification of the methods for generating the password 105.

The password creation operation control component 110*c* operates to allow the user 108 access to the client 104. According to another embodiment, the password creation operation control component 110*c* may be configured to more easily enable the user 108 to alter the password component 106 to change the methods by which the password 105 may be generated. This may be useful to provide heightened security. The password creation operation control component 110*c* may include one or more applications that may operate in an operating system environment such as Microsoft's Windows operating system, Unix, or/other operating systems. The password creation operation control component 110*c* may further include one or more applications for generating and maintaining a list of clients and associated asset tags. The password creation operation control component 110*c* also allows the user 108 to modify one or more of the components 106*a-e* to change the creation of the string identifier 114*a*, the obfuscated string identifier 114*b*, the compressed identifier 114*c*, and/or the password 105.

In an embodiment, the password creation operation control component 110*c* registers existing and/or new clients in the network and stores associated asset tags and/or other client related information. The password manager component 110 generates a list of the clients on a network that may be accessed by the user 108 or system administrator to modify the operational aspects of the password component 106.

In some embodiments, the password manager component 110 may include the password context component 106*e* that rejects the password 105 created by the password component 106. If the password 105 is rejected by the password context component 106*e*, the password component 106 may be triggered to create a new password.

Figure 2:
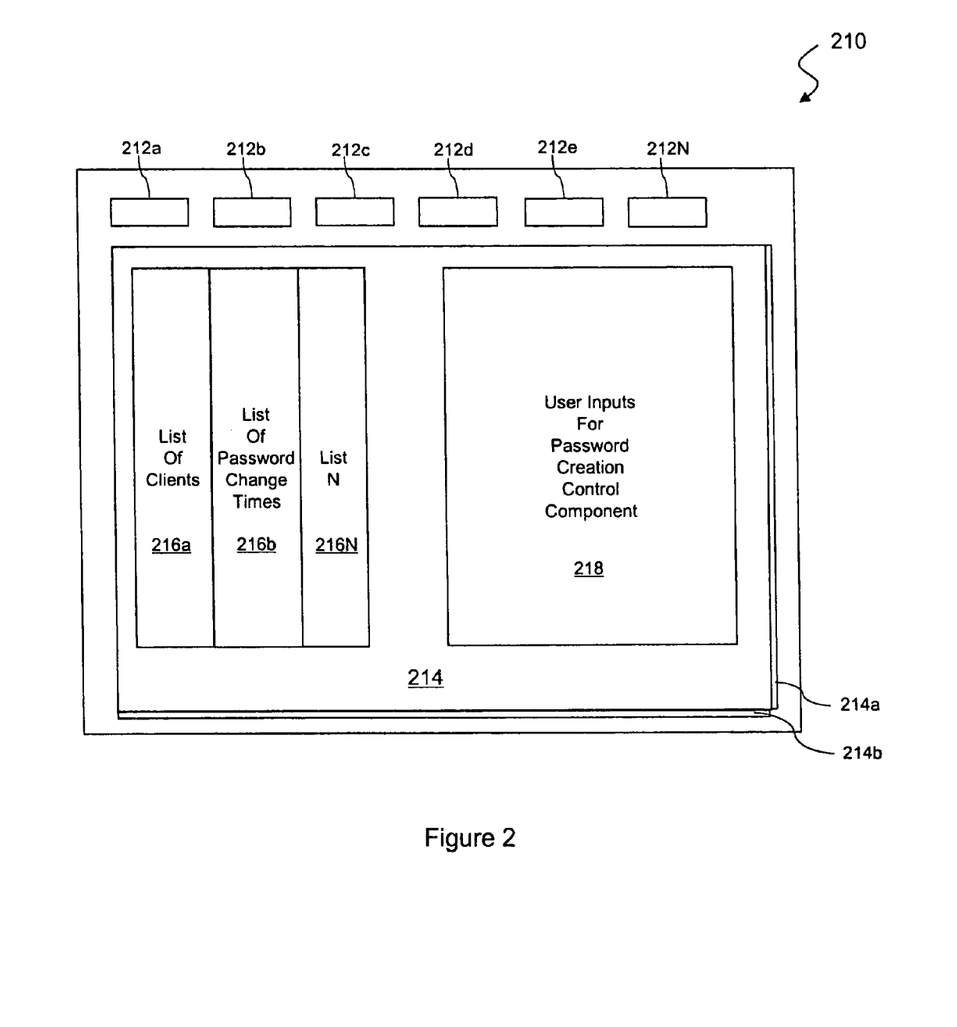
FIG. 2 illustrates one embodiment of a graphical user interface adapted for providing password generation and control according to another aspect of the present disclosure.

Turning now to FIG. 2, a block diagram depicts an embodiment of the present disclosure. The password manager component 110 may operate via a graphical user interface (GUI) 210. The server 102 and/or other administrative entity may include the GUI 210 to access and/or operate aspects of the password manager component 110. The GUI 210 may operate on a general-purpose computer, a mobile device, and/or other device. The GUI 210 may include a web browser, and/or other customized user interface. The GUI 210 may also be adapted for implementing one or more functions or operations associated with the password component 106 and the password manager component 110. The GUI 210 includes buttons 212a, 212b, 212c, 212d, 212e, . . . 212N, and the viewing area 214 with window sliders 214a and 214b.

In an embodiment, the GUI 210 may provide the user 108 or system administrator a dynamic set of configurable lists and inputs. The viewing area 214 may include a list of clients 216a, a list of password change times 216b, and/or other lists N. The viewing area may also include one or more user inputs 218 for operating one or more operational aspects of the password creation and/or control component 218. For example, the user 108 may input one or more rules for the components 106a-e that alter the formation of the password 105 in the inputs 218. The user 108 may also delete or add rules and/or algorithms that may be used by the password component 106 to form the password 105.

Figure 3:
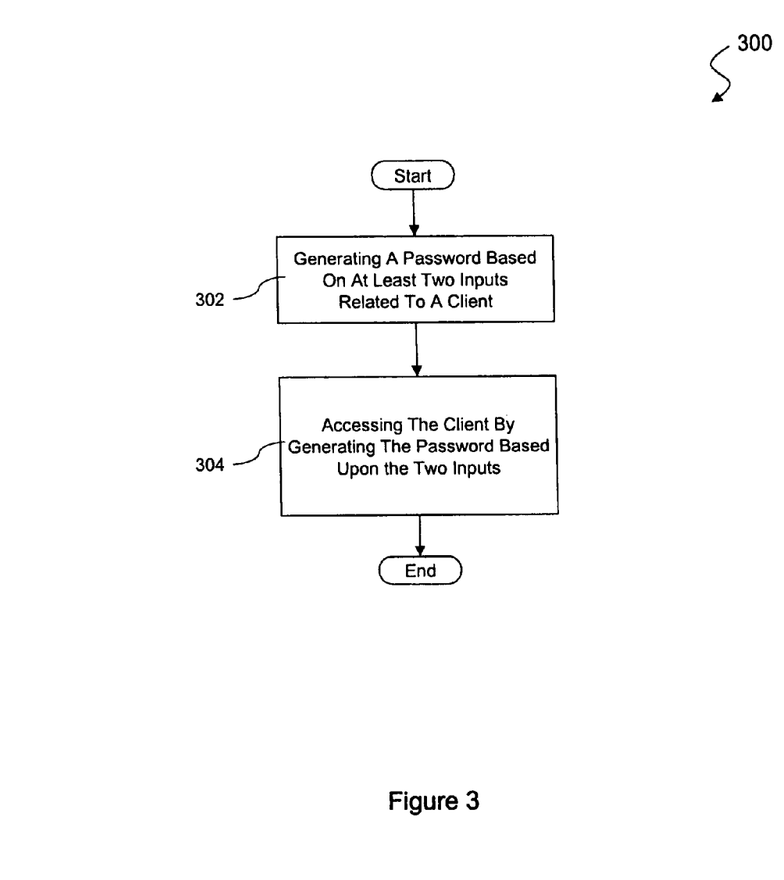
FIG. 3 is a flow diagram of a method for password generation and control according to one embodiment of the present disclosure.

Turning now to FIG. 3, a flow chart illustrates a method 300 for password generation and control. In block 302, the password 105 based upon the date input 112a and the asset tag input 112b is generated by the password component 106 of the client 104. The password 105 may be created on a re-occurring basis. For example, the password 106 may be generated by the password component 106 during non-business hours, such as between about nine PM and about six AM daily. The password 105 may be stored on the client 104 and may not be visible to the user 108.

In block 304, the user 108 or system administrator on a remote client such as the server 102 accesses the client 104 by generating the password 105 based upon the date input 112a and the asset tag input 112b of the client 104. In an embodiment, the server 102 may include the password manager component 110 that may also include the password component 106. The system administrator or user 108 accesses the client 104 by getting the current password from the password manager component 110 that dynamically generates the password 105 of the client 104 and then provides the password to access the client 104.

Of course, it is to be understood that the blocks 302 through 304 may be executed sequentially or in parallel by the system 100. Furthermore, the server 102, the client 104, the password component 106, and/or the password manager component 110 may co-exist within the same data store.

Figure 4:
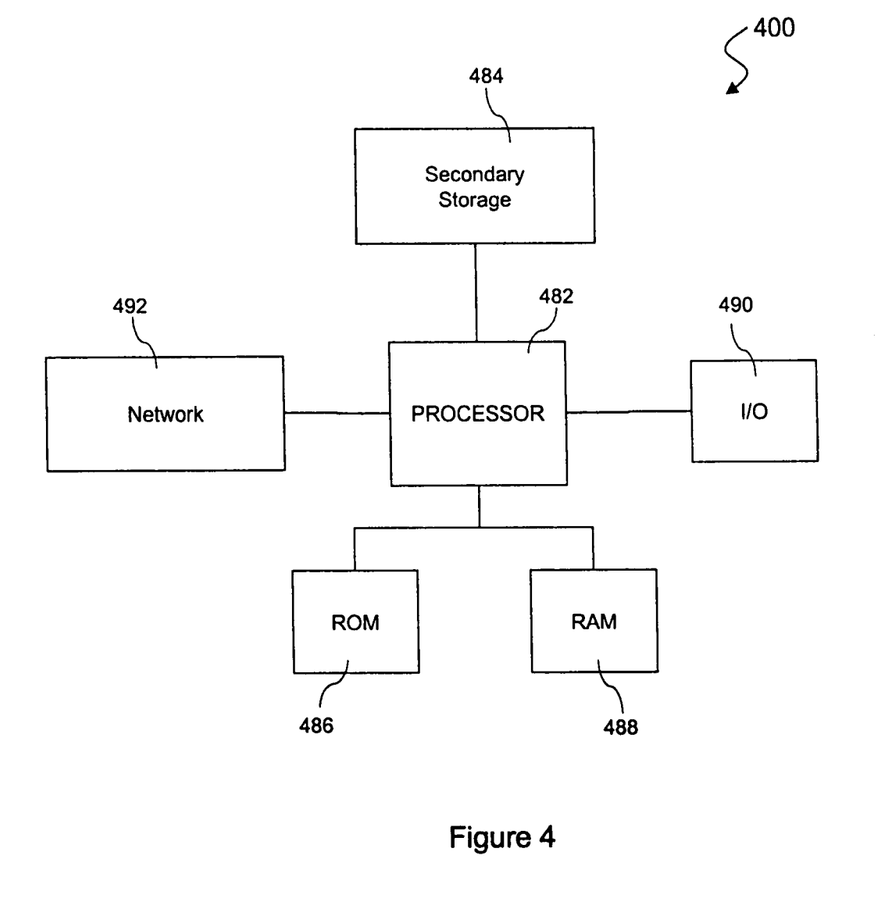
FIG. 4 illustrates an exemplary general-purpose computer system suitable for implementing the several embodiments of the present disclosure.

The system 100 and method 300 described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) 490 devices, and network connectivity devices 492. The processor may be implemented as one or more CPU chips.

The secondary storage 484 is typically comprised of one or more storage devices, such as disk drives, tape drives, but it could be solid-state devices, CDs, or other well known data storage devices used for non-volatile storage of data and as an over-flow data storage device if RAM 488 is not large enough to hold all working data. Secondary storage 484 may be used to store programs, which are loaded into RAM 488 when such programs are selected for execution. The ROM 486 is used to store instructions and perhaps data that are read during program execution. ROM 486 is a non-volatile memory device, which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O 490 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 492 devices may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity 492 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts that it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for password generation and control, comprising:
   a password component operable on a client system to automatically generate on a re-occurring basis a password for an application on the client system based upon at least two inputs accessible from the client system, to store the password on the client system, and to update the application with the password to allow access to the application with the password until the password component generates a subsequent password and updates the application with the subsequent password; and
   a password manager component operable on a server system to generate the password using the at least two inputs to enable access to the application on the client system from the server system.

2. The system of claim 1, wherein the password component further comprises:
   a hash component operable to create a string of characters based upon the two inputs;
   a mathematical operation component operable to change the string of characters; and
   a selection component operable to extract at least one character from the string of characters to form the password.

3. The system of claim 2, further comprising a salt component operable to amend a residual string of characters to the string of characters.

4. The system of claim 2, further comprising a password context component operable to provide context rules to the string of characters to form the password.

5. The system of claim 2, wherein the password component reduces the string of characters to form the password, wherein the password is individually unique based upon at least one of the two inputs associated with the client system.

6. The system of claim 1, wherein the password manager component generates the password based upon a date input provided by a server and an input associated with the client system.

7. The system of claim 1, wherein the password manager component further comprises a scheduling component operable to schedule a modification of at least one operational aspect of the password component.

8. The system of claim 1, wherein at least one of the two inputs comprises an asset tag associated with the client system, wherein the asset tag is further defined as a serial number associated with one of a hardware and a software component of the client system, and wherein the other of the at least two inputs is further defined as one of a date and a time.

9. The system of claim 1, wherein the password manager component is configurable through a graphical user interface providing at least one input to alter the formation of the password.

10. A system for password generation and control, comprising:
    a password component to obtain a tag and use the tag to periodically generate only one password for an application on a first computer, to store the password on the first computer, to update the application with the password to allow access to the application with the password until the password component periodically generates a subsequent password and updates the application with the subsequent password, wherein the tag is related to the first computer; and
    a manager component operable on a second computer to receive the tag to generate the password to enable access to the application on the first computer from the second computer.

11. The system of claim 10, wherein the password component is operable on the first computer.

12. The system of claim 10, wherein the password component includes a generator having logic programmed to use the tag and generate the password, wherein the manager component includes logic substantially similar to the logic of the password component generator to use the tag to generate the password.

13. The system of claim 10, wherein the tag is further defined as a serial number associated with one of a hardware and a software component of the first computer.

14. A method for password generation and control, comprising:
    obtaining a tag associated with a client computer;
    generating on a periodic basis a password using the tag, the password for an application accessible by the client computer;
    storing the password on the client computer;
    updating the application with the password to allow access to the application via the generated password until a subsequent password is periodically generated and the application is updated with the subsequent password; and
    generating the password by a server system for the application using the tag to enable access to the application on the client system from the server system.

15. The method of claim 14, further comprising accessing the application from the server system by:
    selecting the client computer; and
    generating the password by the server system for the application.

16. The method of claim 15, further comprising using the password to access the application.

17. The method of claim 14, wherein the tag is further defined as a serial number associated with one of a hardware and a software component of the client computer.

18. The method of claim 14, further comprising generating the password using a second input.

19. The method of claim 18, wherein the second input is a date.

20. The system according to claim 1, wherein the re-occurring basis is a periodic basis.

* * * * *